United States Patent [19]
Bischoff et al.

[11] Patent Number: 5,916,492
[45] Date of Patent: Jun. 29, 1999

[54] STRUCTURED PACKING CONTAINING LIQUID-VAPOR CONTACT COLUMN

[75] Inventors: Todd F. Bischoff; Roland Lee Halm; Dennis Gene Van Koevering, all of Midland, Mich.

[73] Assignee: Dow Corning Corporation, Midland, Mich.

[21] Appl. No.: 08/825,299

[22] Filed: Mar. 27, 1997

[51] Int. Cl.$^6$ ..................................................... B01F 3/04
[52] U.S. Cl. ................................................. 261/94; 261/112.2
[58] Field of Search ........................ 261/112.2, 97, 261/110, 94

[56] References Cited

U.S. PATENT DOCUMENTS

| | | |
|---|---|---|
| 2,047,444 | 7/1936 | Stedman . |
| 2,809,818 | 10/1957 | Munters ............................... 261/112.2 |
| 3,402,105 | 9/1968 | Sze . |
| 3,466,151 | 9/1969 | Sicard et al. ......................... 261/112.2 |
| 4,186,159 | 1/1980 | Huber . |
| 4,296,050 | 10/1981 | Meier . |
| 4,455,339 | 6/1984 | Meier . |
| 4,497,752 | 2/1985 | Huber . |
| 4,497,753 | 2/1985 | Streiff . |
| 4,842,778 | 6/1989 | Chen et al. ........................... 261/112.2 |
| 4,882,130 | 11/1989 | Asai et al. ............................ 261/112.2 |
| 5,073,236 | 12/1991 | Gelbein et al. ....................... 261/112.2 |
| 5,224,351 | 7/1993 | Jeannot et al. . |
| 5,234,741 | 8/1993 | Kaffrell ................................ 261/112.2 |
| 5,486,318 | 1/1996 | McKeigue et al. . |
| 5,585,046 | 12/1996 | Jansen et al. .............................. 261/97 |

*Primary Examiner*—Richard L. Chiesa
*Attorney, Agent, or Firm*—William F. Boley; Melvin D. Fletcher

[57] ABSTRACT

An improved structured packing for use in a liquid-vapor contact column. More specifically in a structured packing for liquid-vapor contact where the structured packing comprises laterally orientated channels having peripheral openings, the improvement comprises substantially occluding the peripheral openings with a barrier film. The present invention also includes an improved liquid-vapor contact column comprising a column shell having positioned within a structured packing comprising an outer surface in non-occlusive proximation to the column shell and laterally orientated channels having peripheral openings through the outer surface, the improvement comprising substantially occluding the peripheral openings with a barrier film.

8 Claims, 1 Drawing Sheet

STRUCTURED PACKING CONTAINING LIQUID-VAPOR CONTACT COLUMN

BACKGROUND OF INVENTION

The present invention is an improvement to structured packing used in liquid-vapor contact columns and to columns using structured packing. The improvement comprises occluding peripheral openings of the structured packing that open into an interspace formed between the column shell and the structured packing when they are positioned in non-occlusive opposition to each other with a barrier film. The occlusion of the peripheral openings reduces vapor flow in the interspace thereby improving liquid-vapor contact in the structured packing and improving column performance.

Structured packing is being increasingly utilized in the process industry in liquid-vapor contact columns. Structured packing offers the unique advantages of increased efficiency, lower pressure drop, greater capacity and net energy savings when compared to conventional heat and mass transfer devices such as random packed columns and tray columns. Because of these advantages structured packing is increasingly being used to retrofit existing separation columns.

Structured packings typically are fairly rigid pre-formed structures comprising ordered elements which form channels opening to the periphery of the packing. The materials of construction for such structured packings can include corrugated meshes and sheets fabricated from, for example, metals, plastics, and ceramics. Therefore, the structured packings may not easily be conformed to the inner wall of a column shell and in the situation where the inner wall of a column is non-uniform it may be necessary to undersize the pre-formed structured packing to facilitate its placement in the column. In these situations the channels opening to the periphery of the structured packing provide a means for vapors to enter into the interspace between the column shell and the structured packing, thereby reducing contact of the vapor phase with the liquid phase contained in the structured packing. This vapor by-passing produces a discontinuity in liquid-vapor contact in the column reducing heat and mass transfer between vapors and liquids in the column and results in reduced column performance.

One attempt to reduce this discontinuity in liquid-vapor contact has been to fit the-structured packing with one or more bands on the outside of the packing elements that serve as "wipers" and are intended to provide a seal between the packing elements and the column shell. The use of such wiper bands is described, for example, in McKeigue et al., U.S. Pat. No. 5,486,318. Jeannot et. al., U.S. Pat. No. 5,224,351, describe a sealing device prepared from a continuous band of an appropriate material of small thickness such as a metal or plastic.

The present inventors have discovered that in those situations where an interspace exist between the column shell and the structured packing positioned therein that such bands are not entirely satisfactory because significant vapor flow can by-pass the structured packing by flowing through the interspace between the bands. The present invention is intended to reduce the vapor exiting the structured packings through the laterally orientated peripherally opening channels and therefore reduce the flow of vapors exterior to the bulk of the structured packing.

Another method that has been proposed to reduce this discontinuity in liquid-vapor contact is to fill the interspace space between the column shell and the structured packing with a random packing. Using this method is often difficult in columns having irregular surfaces to insure adequate filling of the space to avoid channeling and subsequent removal of the structured packing is made more difficult and time consuming.

SUMMARY OF INVENTION

The present invention is an improved structured packing for use in a liquid-vapor contact column. More specifically in a structured packing for liquid-vapor contact where the structured packing comprises laterally orientated channels having peripheral openings, the improvement comprises substantially occluding the peripheral openings with a barrier film. The present invention also includes an improved liquid-vapor contact column comprising a column shell having positioned within a structured packing comprising an outer surface in non-occlusive proximation to the column shell and laterally orientated channels having peripheral openings through the outer surface, the improvement comprising substantially occluding the peripheral openings with a barrier film.

DESCRIPTION OF INVENTION

Figure 1:
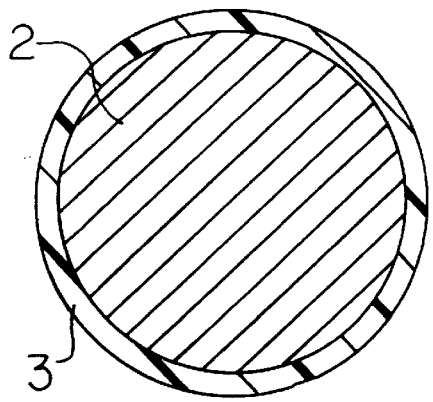
FIG. 1 is a cross-section of structured packing comprising laterally orientated channels having peripheral openings occluded with a barrier film.

The present invention is an improved structured packing for use in a liquid-vapor contact column. More specifically in a structured packing for liquid-vapor contact where the structured packing comprises laterally orientated channels having peripheral openings, the improvement comprises substantially occluding the peripheral openings with a barrier film.

The present invention is also a liquid-vapor contact column comprising a column shell having positioned within a structured packing comprising an outer surface in non-occlusive proximation to the column shell and laterally orientated channels having peripheral openings through the outer surface, the improvement comprising substantially occluding the peripheral openings with a barrier film.

The term "liquid-vapor contact column" as used herein means a contacting column or zone where liquid and vapor phases are contacted to effect separation or reaction and separation of a fluid mixture by contacting of the vapor and liquid phases on packing elements within the column. The general size, shape, construction, and materials of fabrication of the column are not generally limiting and can be those known in the art for such columns suitable for their intended uses.

The term "structured packing" as used herein means any liquid-vapor contact media having a regularly repeating pattern of surfaces which facilitates the contact of liquid and vapor phases to effect heat and/or mass transfer between the phases. The structured packing can be formed from elements comprising corrugated sheets, textured sheets, stamped or bent sheets, or combination of such sheets in the presence or absence of interspacing flat sheets. The sheets described above may be perforated. Each of the sheets described above may contain a combination of one or more physical modifications including those of corrugations, texturing, stampings, bends, and perforations. The physical shapes and modifications of the elements forming the structured packing is not limiting on the present invention as long as the elements can be arranged to form laterally orientated channels having peripheral openings.

The structured packing has laterally orientated channels. By "laterally orientated" channels it is meant that when the structured packing is in a desired orientation for placement in a liquid-vapor contact column that the channels open at a side of the structured packing intended to be in opposition to the side wall of a column shell, as opposed to opening on the top or bottom of the structured packing.

The material of construction of the structured packing can be, for example, metal, plastic, or ceramic. The structured packing can be formed from, for example, stainless steel, polytetrafluoroethylene, polyethylene, ceramic, or a combination of such materials. The material of construction may be, for example, in the form of a solid sheet with or without physical modifications or of a mesh with or without physical modifications.

Examples of structured packings useful in the present invention include those described in Stedman, U.S. Pat. No. 2,047,444; Sze, U.S. Pat. No. 3,402,105; Huber, U.S. Pat. No. 4,186,159; Meier, U.S. Pat. No. 4,296,050; Meier, U.S. Pat. No. 4,455,339; Huber, U.S. Pat. No. 4,497,752; and Streiff, U.S. Pat. No. 4,497,753, all of which are incorporated by reference for such teachings.

In the present invention the structured packing comprises laterally orientated channels having peripheral openings, the improvement comprising occluding the peripheral openings with a barrier film. The barrier film of the present invention can be constructed from any material which can generally be conformed to the surface of the structured packing containing the peripheral openings thereby effecting occlusion of the peripheral openings and reducing or preventing vapor exiting therefrom. The barrier film can be formed from, for example, metal, plastic, rubber, or foam. The barrier film can be, for example, in the form of a sheet or foil. The barrier film can be, for example, a flexible polymeric sheet formed from a plastic such as polytetrafluoroethylene, polypropylene, or polyethylene, or a rubber such as a silicone elastomer. The barrier film can be formed, for example, from a thin metal sheet or foil or from a curable viscous liquid such as a curable silicone elastomer or foam composition which is cured in place. The thickness of the barrier film can be at a minimum any thickness which provides a barrier for reducing vapors exiting the peripheral openings to a maximum thickness which totally fills the interspace between the structured packing and a column shell. In those situations where the barrier film is created around the structured packing by applying a curable viscous liquid or foam which cures in place, the barrier film may extend partially into the laterally orientated channels having peripheral openings.

The method of retaining the barrier film in occlusive contact with the peripheral openings is not critical to the present invention. The barrier film can be retained by attachment to the exterior surface of the elements forming the laterally orientated channels by, for example, welding, fusing, gluing, interdigitating, banding, or a combination thereof. The barrier film may be retained in place by compressive fit against a column shell.

The present improvement comprises substantially occluding the peripheral openings with a barrier film. By the term "substantially" it is meant that all or a portion of the peripheral openings of the laterally orientated channels may be partially or totally occluded by the barrier film in a manner to restrict the exit of vapor from the peripheral openings. By use of the term "substantially" it is meant to exclude those situations where minor portions of such peripheral openings are occluded by close compression against a column shell or by incidental compressive occlusion of the peripheral openings during manufacture, handling, and installation processes. In a preferred embodiment of the present invention at least 90 percent of the peripheral openings are partially or totally occluded by the barrier film.

When a structured packing is sized to be used as a single element in a column or as a vertically stacked segment then the circumference of the stacked element may be partially or entirely occluded with a barrier film as illustrated in FIG. 1. When the structured packing is sized such that an array of elements are necessary to pack the column as illustrated in FIG. 2, then it is generally desirable to only occlude all or a portion of the peripheral openings of the laterally orientated channels which will be at the surface of the structured packing intended to be in opposition to a column shell.

The advantage of the present improvement to structured packing is particularly realized when the structured packing comprises an outer surface in non-occlusive proximity to a column shell and laterally orientated channels having peripheral openings through the outer surface. By the term "non-occlusive proximity" it is meant that a space exists between at least a portion of the outer surface of the structured packing and the column shell. The barrier film may occupy all or a portion of such space.

Further description of the inventions described herein is provided by reference to FIGS. 1–4. FIG. 1 is a cross-section of structured packing 2 comprising laterally orientated channels having peripheral openings occluded with barrier film 3. In FIG. 1, barrier film 3 totally encompasses the circumference of structured packing 2.

Figure 2:
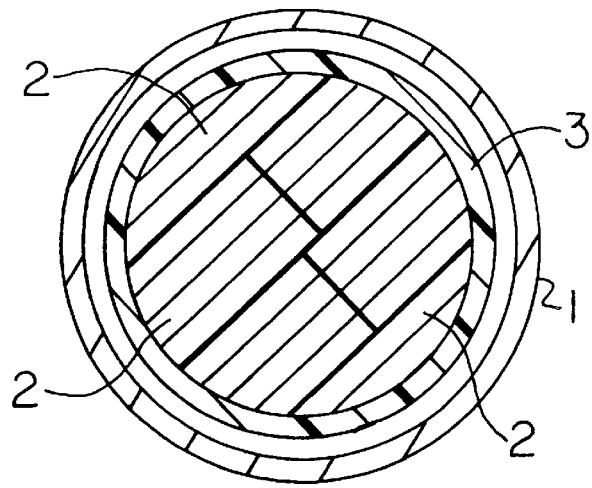
FIG. 2 is a cross-section of a column shell having positioned therein an array of structured packing elements having a barrier film occluding those peripheral openings at the surface of the structured packing elements in non-occlusive opposition with the column shell.

FIG. 2 is a cross-section of column shell 1 containing an array of structured packing elements 2 having barrier film 3 occluding those peripheral openings at the surface of structured packing elements 2 in non-occlusive opposition with column shell 1.

Figure 3:
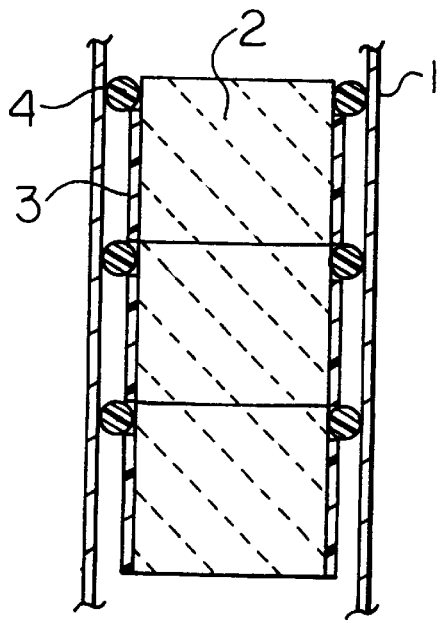
FIG. 3 illustrates an embodiment of the present invention where multiple segments of structured packing are vertically positioned in a column shell.

FIG. 3 illustrates an embodiment of the present invention where multiple structured packing elements comprising laterally orientated channels having peripheral openings are vertically stacked within a column shell. In FIG. 3, column shell 1 has positioned therein multiple segments of structured packing 2. In FIG. 3 each segment of structured packing 2 is sealed at the top against the column shell by wiper band 4. In FIG. 3, barrier film 3 is applied against the surface of structured packing 2 that is in non-occlusive opposition to column shell 1 to occlude the peripheral openings of the laterally orientated channels of structure packing 2. In FIG. 3, barrier film 3 essentially covers the total surface of structured packing 2 that is in non-occlusive opposition to column shell 1.

Figure 4:
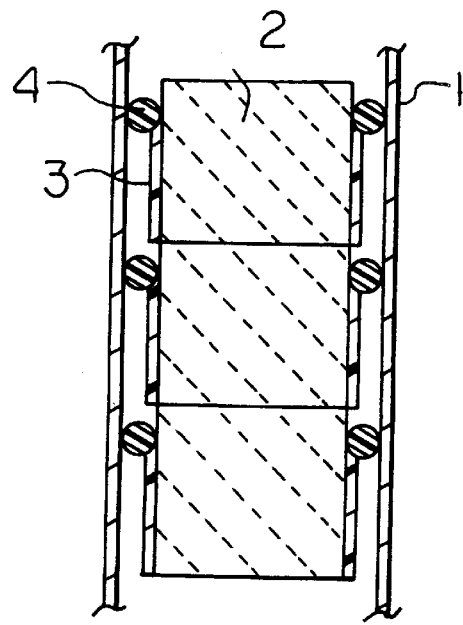
FIG. 4 illustrates a preferred embodiment of the present invention where multiple segments of structured packing are vertically positioned in a column shell.

FIG. 4 illustrates a preferred embodiment of the present invention where multiple structured packing elements comprising laterally orientated channels having peripheral openings are vertically stacked within a column shell. In FIG. 4, column shell 1 has positioned therein segments of structured packing 2. In FIG. 4 each segment of structured packing 2 is sealed near the top against the column shell by wiper band 4. In FIG. 4, barrier film 3 is applied against the surface of structured packing 2 that is in non-occlusive opposition to column shell 1 to occlude the peripheral openings of the laterally orientated channels of structured packing 2. In FIG. 4, barrier film 3 is sized and positioned such that a top portion of structured packing 2 is not occluded by barrier material 3. This configuration allows for any liquid which may accumulate in the space between column shell 1 and structured packing 2 to drain down in the column.

The following examples are provided to illustrate the present invention. The examples are not intended to limit the scope of the claims herein.

Example 1. Vapor distribution in a column containing a ceramic structured packing and having a 16 mm gap between the column shell and the structured packing was assessed. The column comprised a 1 m length metal cylinder 32.4 cm in diameter. Positioned in the column approximately 25 cm from the top was a ceramic structured packing 29.2 cm in diameter and 15.2 cm in height (Flexeramic® 28, Koch Engineering Company, Inc., Wichita, Kans.). The 16 mm gap between the structured packing and the column was sealed by wrapping the structured packing with a 16 mm polypropylene rope at either the top (T), bottom (B), or both top and bottom (T/B) as described in Table 1 in the row labelled "Rope Wrap". In run 3, the structured packing was wrapped with paper to occlude the peripheral openings ("Paper Wrap").

Air was fed to the bottom of the column through a distributor and airflow measured by use of a probe inserted into the structured packing and into the interspace between the structure packing and the column shell 10 cm from the bottom of the structured packing. The results of these runs are reported as the ratio of air flow in the interspace between the structured packing and the column shell to the air flow within the structured packing ("Ratio").

TABLE 1

Effect if Barrier Material on Vapor Flow

| Run No. | 1 | 2 | 3 |
| --- | --- | --- | --- |
| Paper Wrap | no | no | yes |
| Rope Wrap | B | T/B | T |
| Ratio | 2.07 | 1.45 | 0.33 |

Example 2. The effect of occluding the peripheral openings of structured packing on liquid-vapor contact was evaluated in a column. The column comprised a 0.6 m length metal channel 9.5 cm by 10.8 cm in cross section. Positioned in the column was a ceramic structured packing 6.4 cm by 7.9 cm in cross section and 8 cm high (Flexeramic 28). The approximate 16 mm gap between the structured packing and the column shell was sealed by wrapping the top edge of the structured packing with a 16 mm polypropylene rope. Water was fed to the top of the reactor through a distributor and air was fed to the bottom of the reactor through a distributor. The relative humidity of the air exiting the top of the reactor was measured as an indication of liquid-vapor contact. In a control run in which the structured packing was not wrapped with a barrier material, the relative humidity of the air exiting the top of the reactor was from 70 to 85%. In a second run the structured packing was wrapped with a 0.8 mm thick sheet of polytetrafluoroethylene to occlude the peripheral openings. In the second run the relative humidity of the air exiting the top of the reactor was 90 to 100%.

We claim:

1. In a liquid-vapor contact column comprising a column shell having positioned within a structured packing comprising an outer surface in non-occlusive proximation to the column shell and laterally orientated channels having peripheral openings through the outer surface, the improvement comprising substantially occluding the peripheral openings with a barrier film comprising a flexible polymeric sheet, where the upper portion of the structured packing is sealed against the column shell by a wiper band.

2. A liquid-vapor contact column according to claim 1, where the structured packing comprises corrugated sheets.

3. A liquid-vapor contact column according to claim 1, where the structured packing comprises corrugated ceramic sheets.

4. A liquid-vapor contact column according to claim 1, where the flexible polymeric sheet is a plastic selected from the group consisting of polytetrafluoroethylene, polypropylene, and polyethylene.

5. A liquid-vapor contact column according to claim 1, where the flexible polymeric sheet is a silicone elastomer.

6. A liquid-vapor contact column according to claim 1, where at least 90 percent of the peripheral openings are partially or totally occluded by the barrier film.

7. A liquid-vapor contact column according to claim 1, further comprising multiple structured packing elements and the peripheral openings are at least 90 percent partially or totally occluded by the barrier film comprising a flexible polymeric sheet.

8. A liquid-vapor contact column according to claim 1, where the flexible polymeric sheet is formed from a foam.

* * * * *